United States Patent
Shin et al.

(10) Patent No.: US 12,293,892 B2
(45) Date of Patent: May 6, 2025

(54) BATTERY PACK HAVING FUSE BOX BRACKET FOR SHORT CIRCUIT PREVENTION

(71) Applicant: LG ENERGY SOLUTION, LTD., Seoul (KR)

(72) Inventors: Ju Hwan Shin, Daejeon (KR); Hyoung Suk Lee, Daejeon (KR); Dong Hyun Kim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 70 days.

(21) Appl. No.: 17/781,120

(22) PCT Filed: Apr. 5, 2021

(86) PCT No.: PCT/KR2021/004185
§ 371 (c)(1),
(2) Date: May 31, 2022

(87) PCT Pub. No.: WO2021/230497
PCT Pub. Date: Nov. 18, 2021

(65) Prior Publication Data
US 2022/0392727 A1    Dec. 8, 2022

(30) Foreign Application Priority Data

May 13, 2020   (KR) .................. 10-2020-0057206

(51) Int. Cl.
*H01H 85/165*   (2006.01)
*H01H 85/055*   (2006.01)
(Continued)

(52) U.S. Cl.
CPC ........ *H01H 85/165* (2013.01); *H01H 85/055* (2013.01); *H01M 50/204* (2021.01); *H01M 50/583* (2021.01); *H01M 2200/103* (2013.01)

(58) Field of Classification Search
CPC . H01H 85/165; H01H 85/055; H01M 50/204; H01M 50/583; H01M 2200/103
(Continued)

(56) References Cited

U.S. PATENT DOCUMENTS 5,892,427 A     4/1999  Handcock
6,459,558 B1 *  10/2002 Hashizawa ............ H01H 85/54
                                              337/228
(Continued)

FOREIGN PATENT DOCUMENTS

CN          1371114 A      9/2002
CN        101926066 A     12/2010
(Continued)

OTHER PUBLICATIONS

International Search Report (PCT/ISA/210) issued in PCT/KR2021/004185 mailed on Jul. 15, 2021.
(Continued)

*Primary Examiner* — Anatoly Vortman
(74) *Attorney, Agent, or Firm* — Birch, Stewart, Kolasch & Birch, LLP

(57) ABSTRACT

A battery pack has a fuse box bracket for short circuit prevention, and more particularly a battery pack configured such that two or more unit modules are electrically connected to each other, the battery pack including a fuse interposed between connection terminals extending from the unit modules; and a fuse box bracket located under the fuse, wherein the fuse includes a central portion made of a nonconductor and an edge portion made of a conductor.

19 Claims, 9 Drawing Sheets

(51) Int. Cl.
*H01M 50/204* (2021.01)
*H01M 50/583* (2021.01)

(58) Field of Classification Search
USPC .......................................................... 337/186
See application file for complete search history.

(56) References Cited

U.S. PATENT DOCUMENTS

| | | | | |
|---|---|---|---|---|
| 7,740,504 B2* | 6/2010 | Chikamatsu | ........ | H01H 85/0208 |
| | | | | 337/186 |
| 7,948,353 B2* | 5/2011 | Deno | ................ | H01H 85/2045 |
| | | | | 337/194 |
| 8,098,126 B2* | 1/2012 | Niedzwiecki | .......... | H01H 9/102 |
| | | | | 337/194 |
| 9,196,445 B2* | 11/2015 | Douglass | ........... | H01H 85/0013 |
| 9,251,985 B2* | 2/2016 | Garascia | ................. | H01H 9/20 |
| 9,425,453 B2* | 8/2016 | Han | .................... | H01M 50/507 |
| 9,728,363 B2* | 8/2017 | Carnick | ............. | H01H 85/0241 |
| 10,217,593 B2* | 2/2019 | Bougeard | ................ | H02B 1/18 |
| 10,340,111 B2* | 7/2019 | Kawai | .................. | H01H 85/185 |
| 10,468,661 B2* | 11/2019 | Shen | ...................... | B60L 3/0069 |
| 11,177,530 B2* | 11/2021 | You | ...................... | H01M 50/211 |
| 2001/0000596 A1* | 5/2001 | Konda | .................... | H01H 9/104 |
| | | | | 200/50.09 |
| 2002/0101323 A1 | 8/2002 | Ranjan et al. | | |
| 2002/0109574 A1 | 8/2002 | Handcock et al. | | |
| 2005/0001710 A1 | 1/2005 | Mukai et al. | | |
| 2008/0213652 A1* | 9/2008 | Scheucher | .............. | B60L 8/003 |
| | | | | 429/97 |
| 2010/0289611 A1 | 11/2010 | Okada | | |
| 2011/0117390 A1 | 5/2011 | Chun | | |
| 2011/0117400 A1 | 5/2011 | Chun | | |
| 2013/0183562 A1* | 7/2013 | Workman | ........... | H01M 50/502 |
| | | | | 429/100 |
| 2013/0280560 A1 | 10/2013 | Lim | | |
| 2014/0093752 A1* | 4/2014 | Shen | ..................... | B60L 3/0007 |
| | | | | 429/7 |
| 2014/0134462 A1* | 5/2014 | Choi | .................. | H01M 10/482 |
| | | | | 429/61 |
| 2014/0220396 A1 | 8/2014 | Lee et al. | | |
| 2014/0333238 A1 | 11/2014 | Yokoyama | | |
| 2015/0111072 A1* | 4/2015 | Han | ....................... | H01M 50/51 |
| | | | | 429/61 |
| 2016/0099459 A1* | 4/2016 | Doornekamp | ....... | H01M 50/512 |
| | | | | 429/61 |
| 2017/0352859 A1 | 12/2017 | Okamoto | | |
| 2018/0166673 A1* | 6/2018 | Kataoka | ............ | H01M 10/4207 |
| 2018/0174791 A1 | 6/2018 | Kawai et al. | | |
| 2020/0176739 A1* | 6/2020 | You | ........................ | H01M 50/24 |
| 2022/0392727 A1* | 12/2022 | Shin | .................... | H01M 50/583 |

FOREIGN PATENT DOCUMENTS

| | | |
|---|---|---|
| CN | 202839883 U | 3/2013 |
| CN | 104067407 A | 9/2014 |
| CN | 104953082 A | 9/2015 |
| CN | 205113034 U | 3/2016 |
| CN | 205211629 U | 5/2016 |
| CN | 107636789 A | 1/2018 |
| CN | 109545636 A | 3/2019 |
| CN | 209199998 U | 8/2019 |
| CN | 110212142 A | 9/2019 |
| JP | 2002-203528 A | 7/2002 |
| JP | 2005-166436 A | 6/2005 |
| JP | 1698152 A | 11/2005 |
| JP | 2008-300315 A | 12/2008 |
| JP | 2013-225464 A | 10/2013 |
| JP | 2015-5361 A | 1/2015 |
| JP | 2015-5473 A | 1/2015 |
| JP | 2016-115616 A | 6/2016 |
| JP | 2018-198181 A | 12/2018 |
| KR | 10-2011-0053711 A | 5/2011 |
| KR | 10-2015-0115402 A | 10/2015 |
| KR | 10-2017-0050092 A | 5/2017 |
| KR | 10-2019-0131246 A | 11/2019 |
| WO | WO 2013/118874 A1 | 8/2013 |

OTHER PUBLICATIONS

Extended European Search Report for European Application No. 21804936.9, dated Oct. 5, 2023.

* cited by examiner

[FIG. 1]
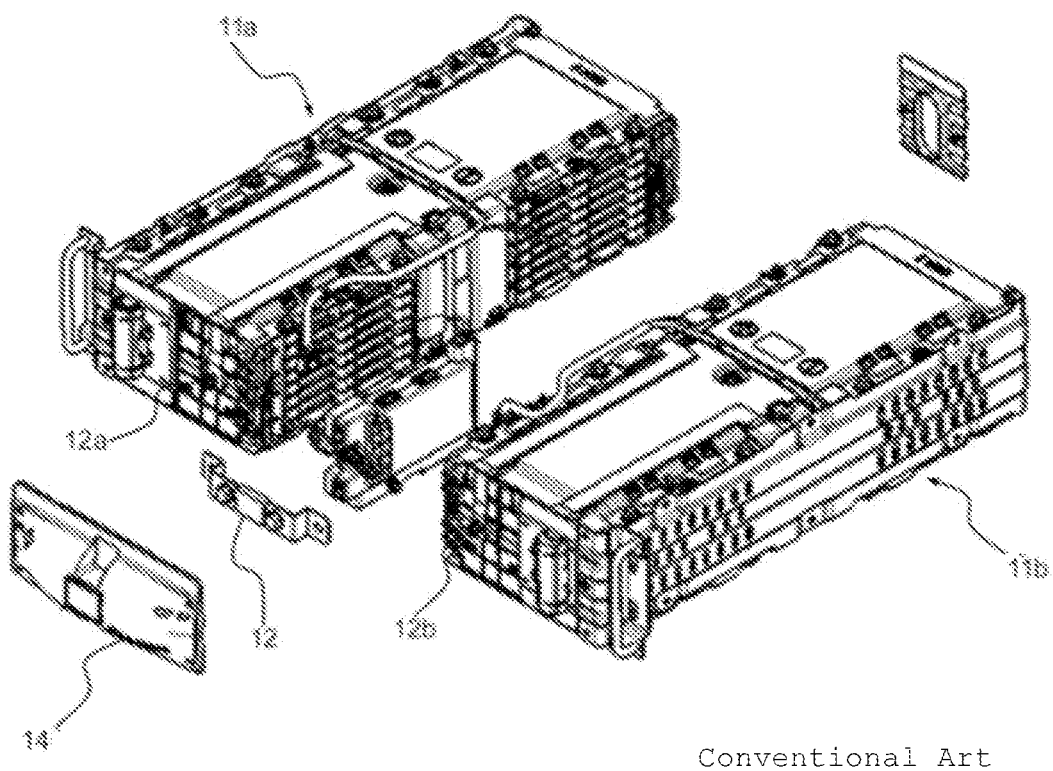
Conventional Art

[FIG. 2]
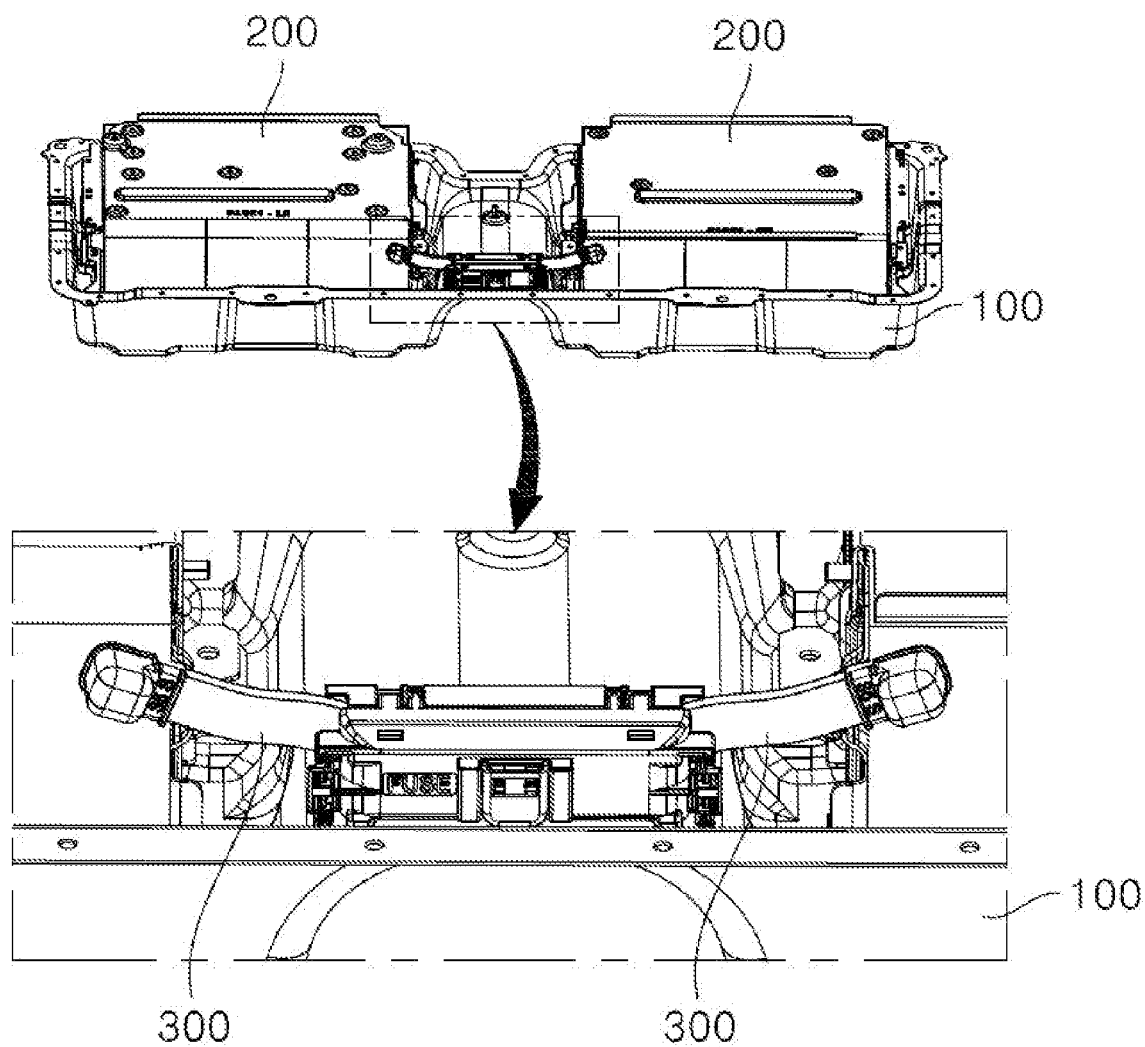

[FIG. 3]
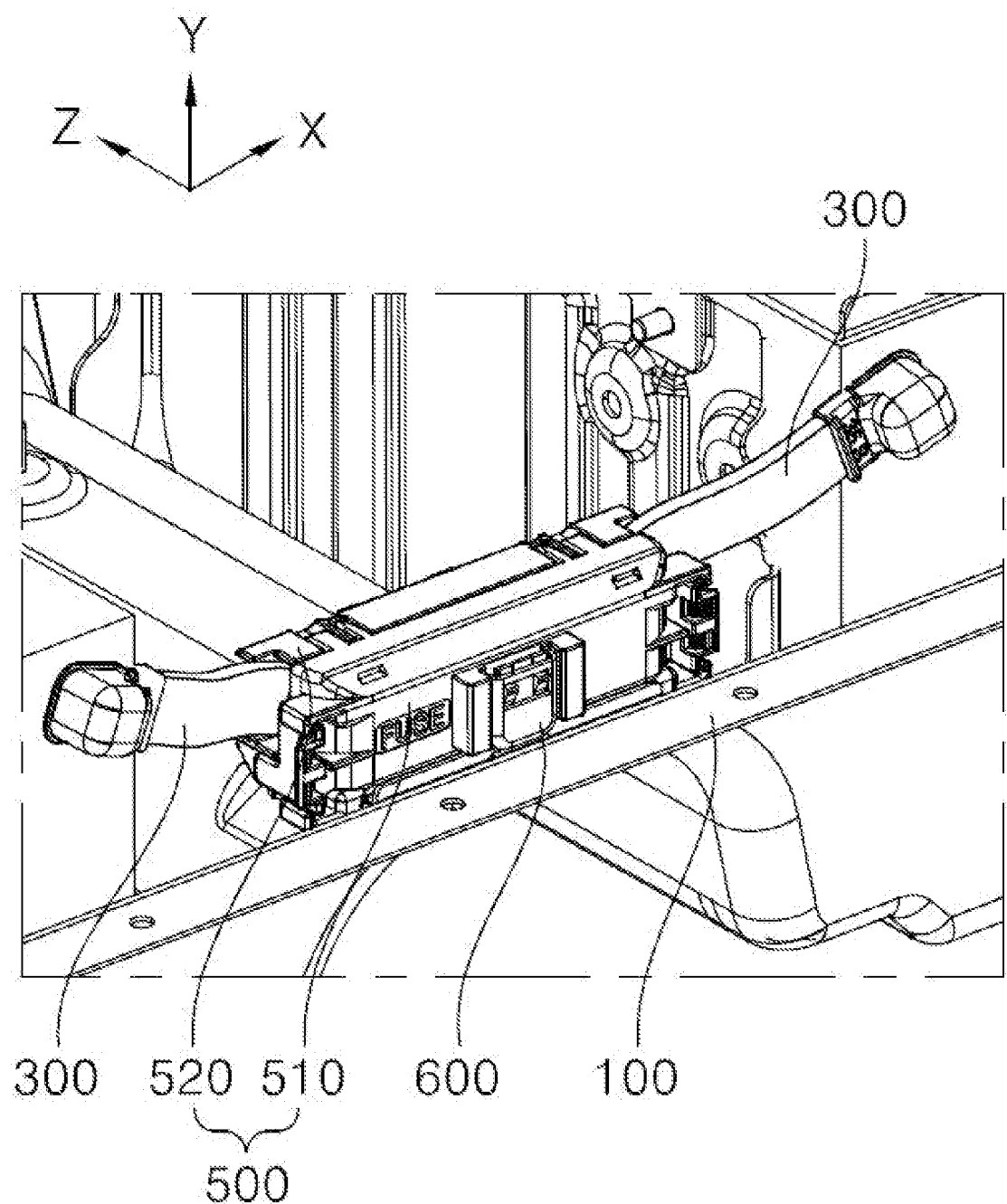

[FIG. 4]
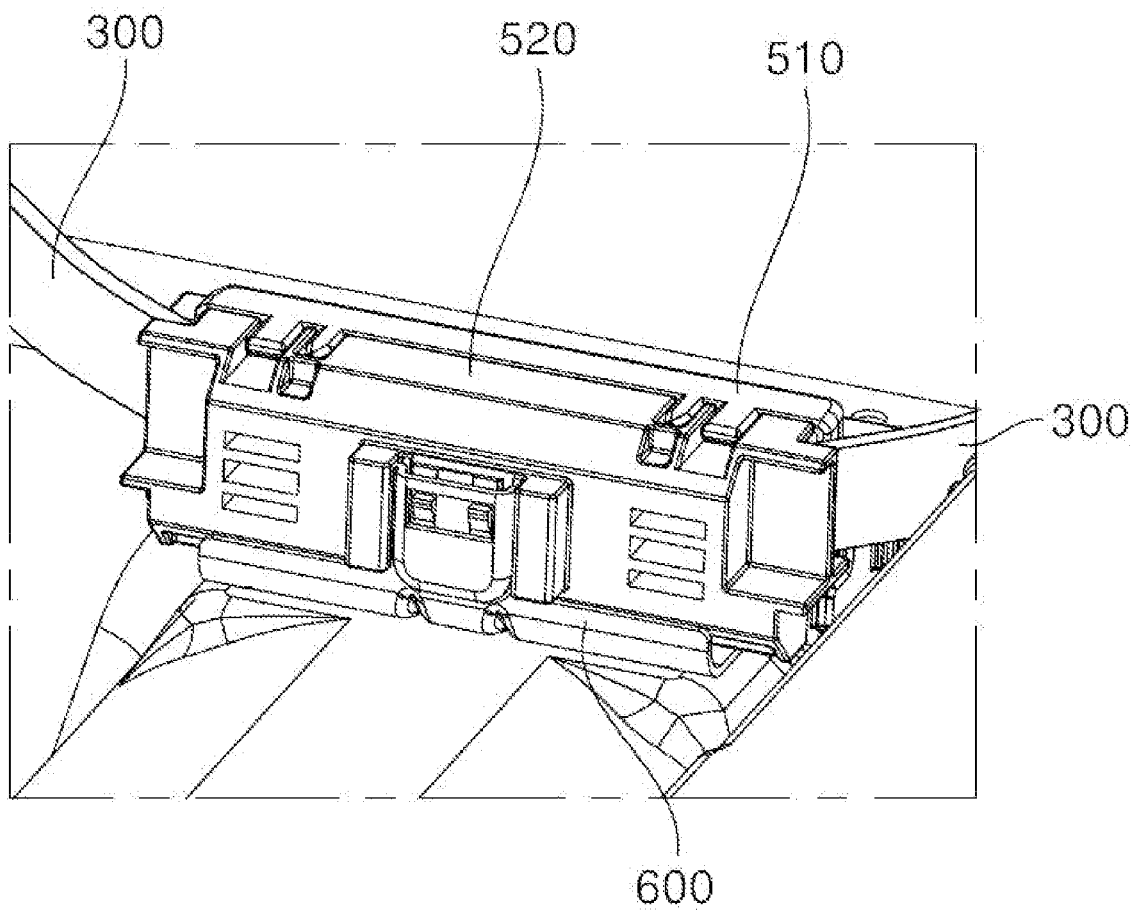

【FIG. 5】
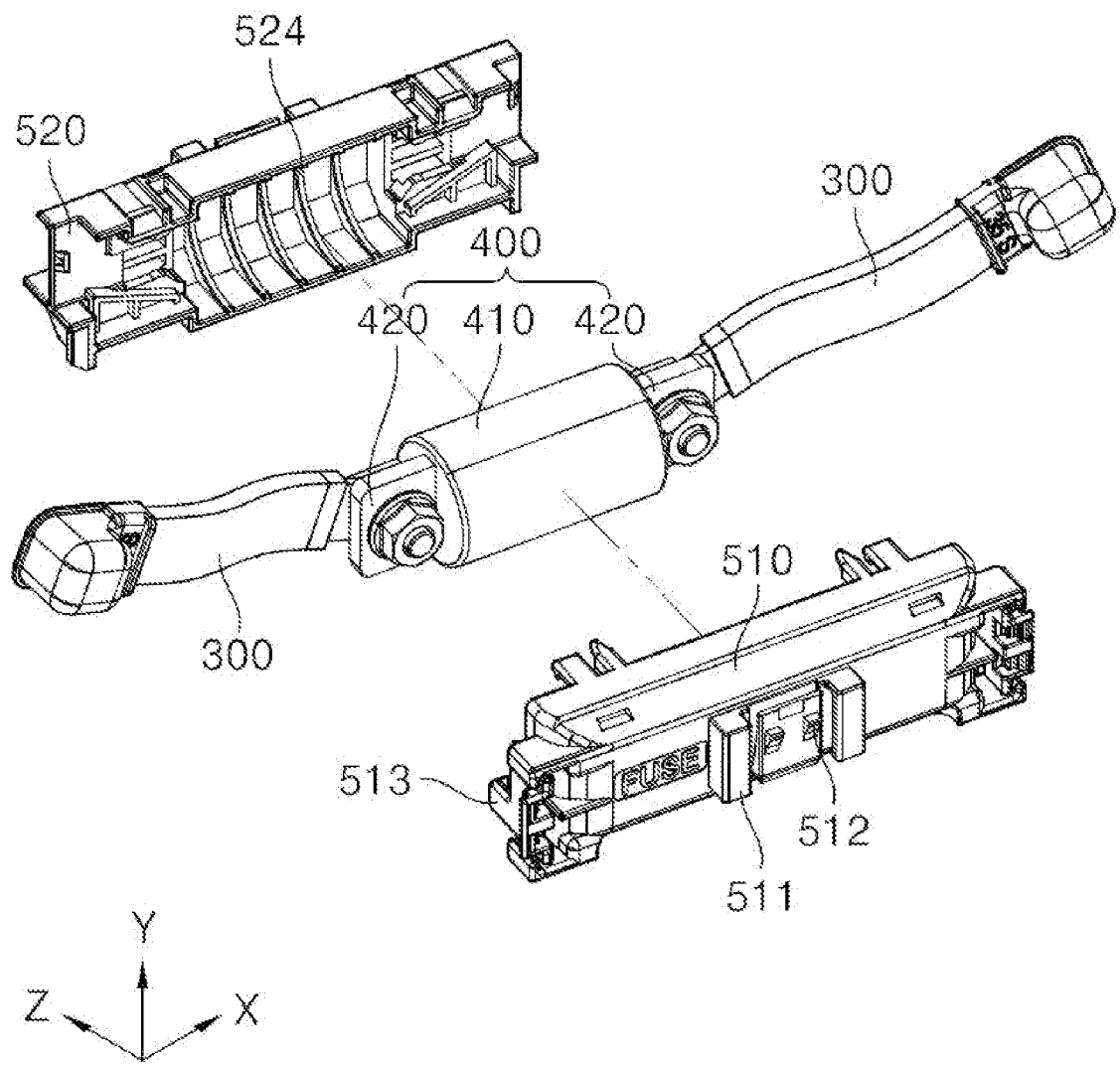

[FIG. 6]
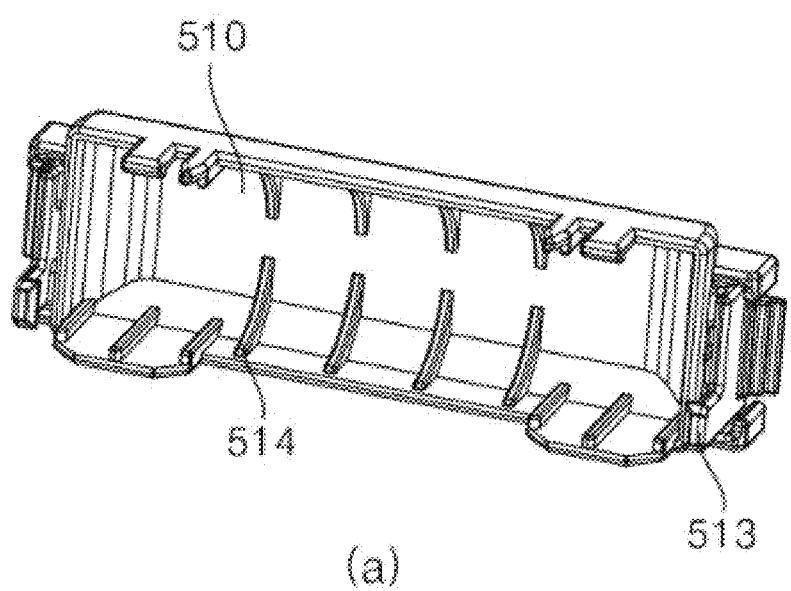
(a)
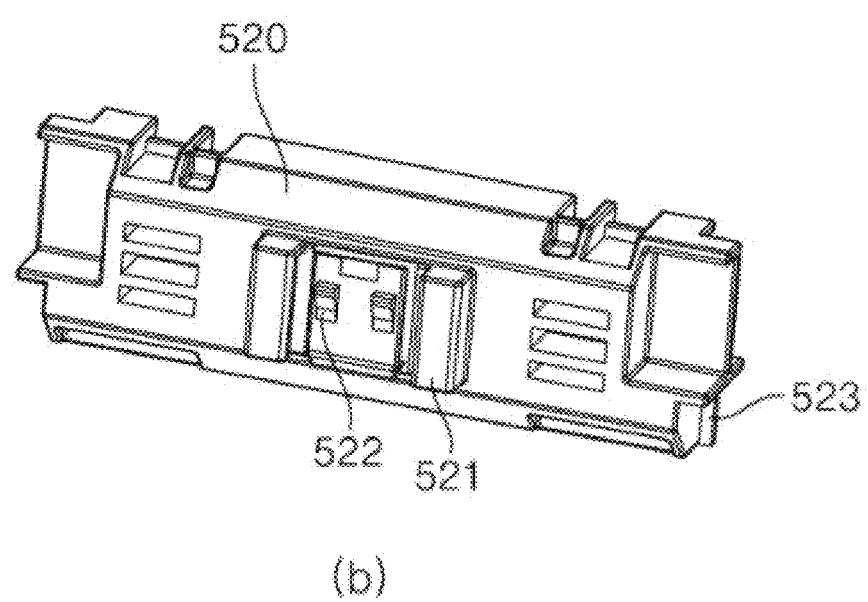
(b)

[FIG. 7]
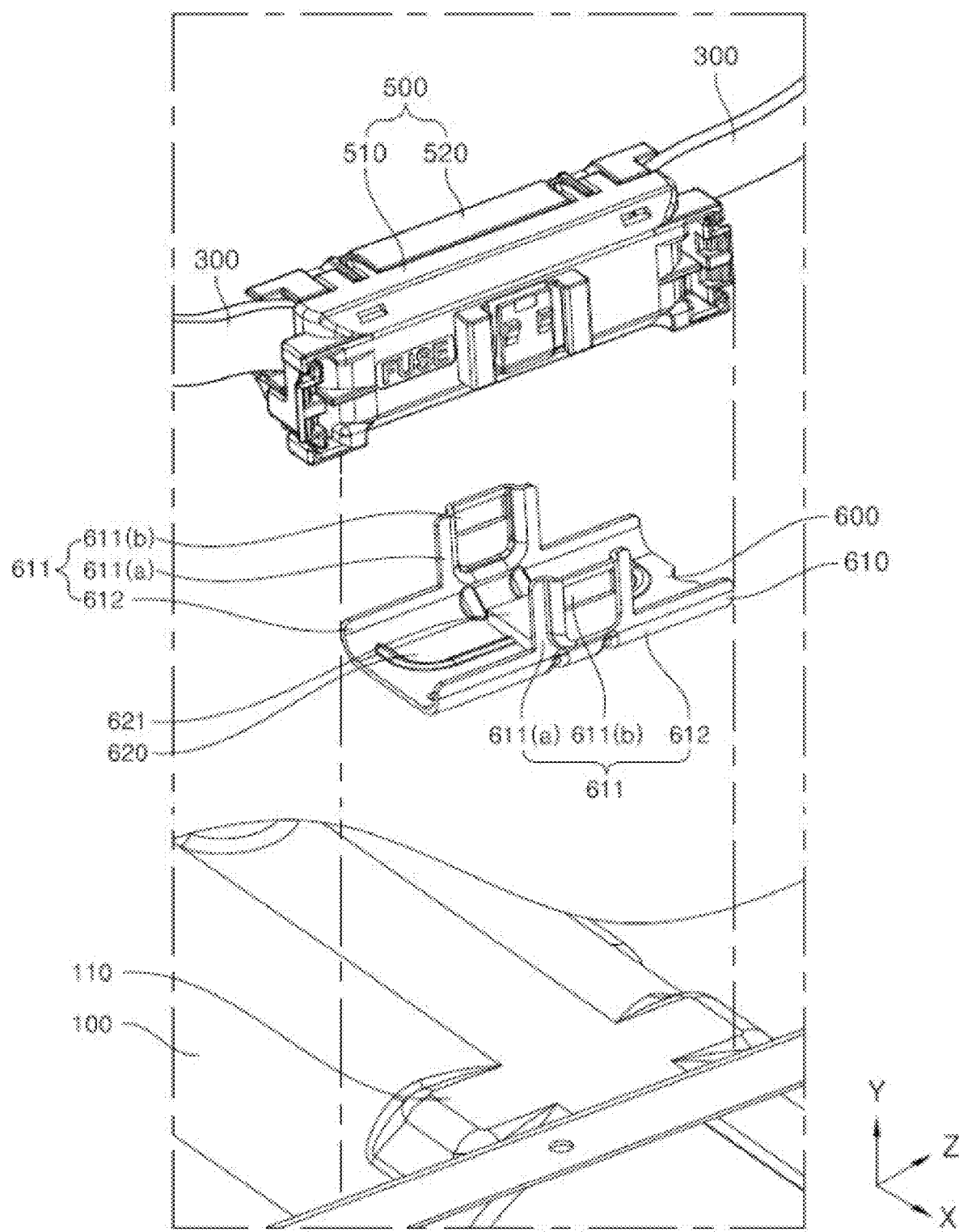

[FIG. 8]
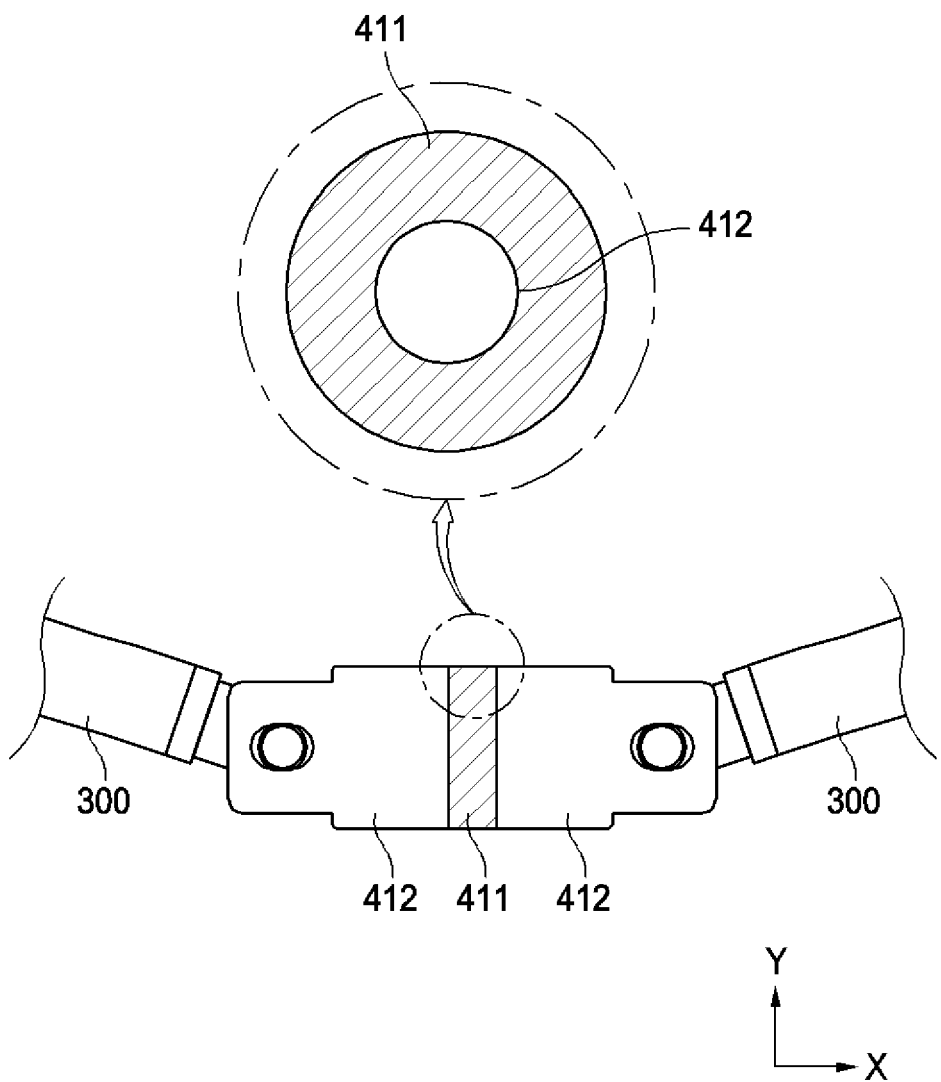

[FIG. 9]
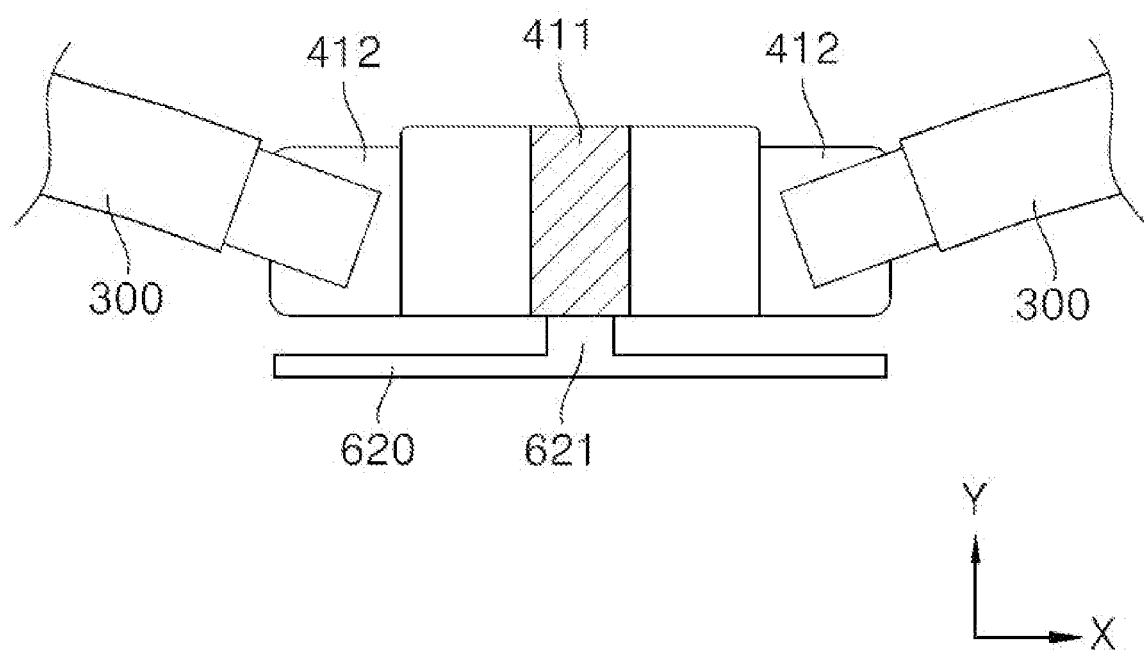

BATTERY PACK HAVING FUSE BOX BRACKET FOR SHORT CIRCUIT PREVENTION

TECHNICAL FIELD

This application claims the benefit of priority to Korean Patent Application No. 2020-0057206 filed on May 13, 2020, the disclosure of which is incorporated herein by reference in its entirety.

The present invention relates to a battery pack having a fuse box bracket for short circuit prevention, and more particularly to a battery pack having a fuse box bracket for short circuit prevention configured such that a fuse and a fuse box bracket are provided between two or more unit modules and such that electrical conduction between the fuse and the fuse box bracket is prevented even when an event occurs in a battery cell, whereby it is possible to prevent occurrence of a secondary event.

BACKGROUND ART

With technological development of mobile devices, such as mobile phones, laptop computers, camcorders, and digital cameras, and an increase in demand therefor, research on secondary batteries, which are capable of being charged and discharged, has been actively conducted. In addition, secondary batteries, which are energy sources substituting for fossil fuels causing air pollution, have been applied to an electric vehicle (EV), a hybrid electric vehicle (HEV), and a plug-in hybrid electric vehicle (P-HEV), and therefore there is an increasing necessity for development of secondary batteries.

There are a nickel-cadmium battery, a nickel-hydride battery, a nickel-zinc battery, and a lithium secondary battery as currently commercialized secondary batteries. Thereamong, the lithium secondary battery is in the spotlight, since the lithium secondary battery has little memory effect, whereby the lithium secondary battery is capable of being freely charged and discharged, has a very low self-discharge rate, and has high energy density, compared to the nickel-based secondary batteries.

Such secondary batteries may be classified into a cylindrical battery having an electrode assembly mounted in a cylindrical metal can, a prismatic battery having an electrode assembly mounted in a prismatic metal can, and a pouch-shaped battery having an electrode assembly mounted in a pouch-shaped case made of an aluminum laminate sheet.

It is sufficient for a single battery module having several battery cells received therein to be used as a secondary battery for small devices. For vehicles, however, a battery pack including a plurality of battery modules connected to each other in series or in parallel is generally used.

FIG. 1 is an exploded perspective view of a conventional battery pack. As shown in FIG. 1, the conventional battery pack is configured such that two battery modules 11a and 11b are arranged side by side and such that external input and output terminals 12a and 12b protrude from front surfaces of the battery modules 11a and 11b, respectively.

The external input and output terminals 12a and 12b of the battery modules 11a and 11b are connected to each other via a fuse 12. That is, the fuse 12 is formed so as to connect the external input and output terminals 12a and 12b of the battery modules 11a and 11b to each other in series. In addition, a fuse cover 14 configured to protect the fuse 12 in a state of wrapping the fuse 12 is provided outside the fuse 12. In this state, the battery pack is fixed to a structure, such as a vehicle.

Meanwhile, when an event, such as short circuit, occurs in the battery modules, the fuse cover, which wraps the fuse 12, melts, whereby the fuse 12 comes into direct contact with the structure. As a result, there is a high possibility of occurrence of a greater accident.

Prior Art Document (Patent Document 1) Korean Patent Application Publication No. 2015-0115402

DISCLOSURE

Technical Problem

The present invention has been made in view of the above problems, and it is an object of the present invention to provide a battery pack having a fuse box bracket for short circuit prevention configured such that such that electrical conduction between a fuse and a structure is prevented even when an event, such as short circuit, occurs in battery modules, whereby it is possible to prevent occurrence of a secondary accident.

Technical Solution

A battery pack according to the present invention to accomplish the above object is a battery pack for electrically connecting two or more unit modules are to each other, the battery pack including a fuse interposed between connection terminals extending from the two or more unit modules; and a fuse box bracket located under the fuse, wherein the fuse includes a central portion made of a nonconductor and an edge portion made of a conductor.

Also, the battery pack according to the present invention may further include a fuse box provided at an outer surface of the fuse, the fuse box being made of a nonconductive material.

Also, in the battery pack according to the present invention, the fuse box bracket may include a pair of side portions configured to support side surfaces of the fuse box and a flat portion configured to support the bottom surface of the fuse box while connecting the pair of side portions to each other.

Also, in the battery pack according to the present invention, a projection may be formed on the flat portion so as to project upwards by a predetermined height.

Also, in the battery pack according to the present invention, the fuse box may include a front fuse box configured to cover a first portion of the fuse and a rear fuse box configured to cover a second portion of the fuse, the front fuse box and the rear fuse box being detachably attached to each other.

Also, in the battery pack according to the present invention, the front fuse box may be provided at the outer surface thereof with a first fastener and a second fastener, and the rear fuse box may be provided at the outer surface thereof with a third fastener and a fourth fastener.

Also, in the battery pack according to the present invention, the front fuse box may be provided at the inner surface thereof with a plurality of first wings spaced apart from each other by a predetermined distance, the first wings being in contact with the outer surface of the fuse, and the rear fuse box may be provided at the inner surface thereof with a plurality of second wings spaced apart from each other by a predetermined distance, the second wings being in contact with the outer surface of the fuse.

Also, in the battery pack according to the present invention, the pair of side portions of the fuse box bracket may be provided with a pair of first fixing portions fastened to the first fastener of the front fuse box and the third fastener of the rear fuse box and a pair of second fixing portions fastened to the second fastener of the front fuse box and the fourth fastener of the rear fuse box.

Also, in the battery pack according to the present invention, the central portion of the fuse is located on a same vertical line as the projecting portion of the fuse box bracket.

Also, in the battery pack according to the present invention, the sectional area of the central portion of the fuse may be equal to or greater than the sectional area of the projecting portion of the fuse box bracket.

Also, in the battery pack according to the present invention, the fuse box may have a melting point of 400° C. or lower.

Also, in the battery pack according to the present invention, the fuse box bracket may be made of a metal material having a melting point higher than the melting point of the fuse box.

Also, in the battery pack according to the present invention, the fuse may be a high voltage (HV) fuse.

Advantageous Effects

A battery pack having a fuse box bracket for short circuit prevention according to the present invention has an advantage in that a fuse including a central portion made of a nonconductor and an edge portion made of a conductor is used, and the central portion of the fuse is located at the upper part of a projecting portion of a fuse box bracket, whereby a structure and the fuse do not directly contact each other even when a fuse box melts and flows down due to occurrence of an event, and therefore it is possible to prevent occurrence of a secondary accident.

In addition, the battery pack having the fuse box bracket for short circuit prevention according to the present invention has a merit in that the fuse box that wraps the fuse has a detachable structure, whereby assembly and disassembly of the fuse box are easily performed.

Furthermore, the battery pack having the fuse box bracket for short circuit prevention according to the present invention has an advantage in that the fuse box and the fuse box bracket are provided with pluralities of fastening portions, whereby it is possible to securely support the fuse box.

DESCRIPTION OF DRAWINGS

FIG. 1 is an exploded perspective view of a conventional battery pack.

FIG. 2 is a perspective view of a battery pack according to a preferred embodiment of the present invention when viewed from the front in order to illustrate a battery module connection structure.

FIG. 3 is a perspective view of the battery pack according to the preferred embodiment of the present invention when viewed from one side in order to illustrate the battery module connection structure.

FIG. 4 is a perspective view of the battery pack according to the preferred embodiment of the present invention when viewed from the other side in order to illustrate the battery module connection structure.

FIG. 5 is an exploded perspective view of a fuse and a fuse box in the battery pack according to the preferred embodiment of the present invention.

FIG. 6 is an interior perspective view of a front fuse box (a) and an exterior perspective view of a rear fuse box (b) in the battery pack according to the preferred embodiment of the present invention.

FIG. 7 is an exploded perspective view of a battery module connection unit in the battery pack according to the preferred embodiment of the present invention.

FIG. 8 is a sectional view of the fuse and connection terminals of FIG. 5 cut in an X-axis direction in the battery pack according to the preferred embodiment of the present invention.

FIG. 9 is a sectional view illustrating the position of the fuse at the upper part of a fuse box bracket in the battery pack according to the preferred embodiment of the present invention.

BEST MODE

In the present application, it should be understood that the terms "comprises," "has," "includes," etc. specify the presence of stated features, numbers, steps, operations, elements, components, or combinations thereof, but do not preclude the presence or addition of one or more other features, numbers, steps, operations, elements, components, or combinations thereof.

In addition, the same reference numbers will be used throughout the drawings to refer to parts that perform similar functions or operations. In the case in which one part is said to be connected to another part in the specification, not only may the one part be directly connected to the other part, but also, the one part may be indirectly connected to the other part via a further part. In addition, that a certain element is included does not mean that other elements are excluded, but means that such elements may be further included unless mentioned otherwise.

Hereinafter, a battery pack having a fuse box bracket for short circuit prevention according to the present invention will be described.

FIG. 2 is a perspective view of a battery pack according to a preferred embodiment of the present invention when viewed from the front in order to illustrate a battery module connection structure, FIG. 3 is a perspective view of the battery pack according to the preferred embodiment of the present invention when viewed from one side in order to illustrate the battery module connection structure, and FIG. 4 is a perspective view of the battery pack according to the preferred embodiment of the present invention when viewed from the other side in order to illustrate the battery module connection structure.

As shown in FIGS. 2 to 4, the battery pack according to the present invention is configured such that two battery modules 200 are received in a space defined in a case 100 and such that connection terminals 300 extending from one sides of the battery modules 200 are electrically connected to each other in the state in which a fuse, a description of which will follow, is interposed therebetween.

More specifically, a connection terminal 300 corresponding to a positive electrode terminal extends from a battery module 200 located at one side, a connection terminal 300 corresponding to a negative electrode terminal extends from a battery module 200 located at the other side, and a fuse is located between the connection terminals 300.

A fuse box 500 configured to protect the fuse and to prevent electrical conduction between the fuse and a structure adjacent thereto, i.e. a fuse box 500 including a front fuse box 510 and a rear fuse box 520, is provided outside the fuse, and a fuse box bracket 600 configured to fix and support the fuse box 500 is seated at a predetermined position in the upper part of the case 100 so as to wrap the bottom surface and a portion of the side surface of the fuse box 500.

Meanwhile, although the case in which the battery modules 200 are connected to each other in series was described above, it is obvious that the battery modules may be connected to each other in parallel. In the case in which the battery modules 200 are connected to each other in parallel, the connection terminals 300 have the same polarities.

In addition, although two battery modules 200 are shown in the accompanying drawings, which, however, is merely an illustration, three or more battery modules may be provided. In this case, fuses may be located respectively between the battery modules.

FIG. 5 is an exploded perspective view of the fuse and the fuse box in the battery pack according to the preferred embodiment of the present invention, and FIG. 6 is an interior perspective view of the front fuse box (a) and an exterior perspective view of the rear fuse box (b) in the battery pack according to the preferred embodiment of the present invention.

Referring to FIGS. 5 and 6, the fuse 400 is connected between the pair of connection terminals 300 in order to prevent an event of a battery, such as a short circuit phenomenon, as previously described, and the fuse 400 includes a body portion 410 and a connection portion 420.

The body portion 410, which has a cylindrical shape, includes a central portion made of a nonconductor and an edge portion made of a conductor, which will be described below in detail.

The connection terminals 300 are fastened and fixed to a pair of connection portions 420 extending from opposite ends of the body portion 410 by a predetermined length and having a flat shape. As an example, the connection terminals 300 may be fixed to the body portion 420 using bolts and nuts, which, however, is merely an illustration. A fixing means is not particularly restricted as long as it is possible to fix the connection terminals and the body portion to each other.

The fuse box 500, which includes the front fuse box 510 and the rear fuse box 520, is located so as to wrap the outside of the fuse 400 connected to the connection terminals 300.

Specifically, the front fuse box 510 covers approximately half of the body portion 410 of the fuse 400 that faces to the front, a first fastening portion 511 including a pair of projections extending in a height direction (a Y-axis direction) in a state of being spaced apart from each other by a predetermined distance is formed at a middle part of the outer surface thereof, and a second fastening portion 512 including one or more protrusions is provided between the pair of slits. The first fastening portion 511 and the second fastening portion 512 are connected to one surface of the fuse box bracket 600, a description of which will follow.

In addition, a plurality of first wings 514 configured to be brought into tight contact with the outer surface of the body portion 410 of the fuse 400 is formed at the inner surface of the front fuse box 511 in a state of being spaced apart from each other by a predetermined distance. The fuse 400 according to the present invention is a high voltage (HV) fuse. That is, each battery module 200 is configured such that a plurality of battery cells is connected to each other in series or in parallel, and when battery modules 200 are connected to each other, considerably high voltage is applied. Since the fuse 400 interposed between the connection terminals of the battery modules 200 is heated to a relatively high temperature, it is preferable for the fuse box 500, which protects the fuse, to have a structure capable of being cooled as much as possible. In the case in which the plurality of first wings 514 is formed so as to be spaced apart from each other by a predetermined distance, as in the present invention, it is possible to rapidly discharge heat generated from the fuse 400 and to securely fix the body portion 410 of the fuse 400.

The rear fuse box 520 covers the other half of the body portion 410 of the fuse 400 that faces to the rear, a third fastening portion 521 including a pair of slits (not shown) extending in the height direction (the Y-axis direction) in a state of being spaced apart from each other by a predetermined distance is formed at a middle part of the outer surface thereof, and a fourth fastening portion 522 including one or more protrusions is provided between the pair of slits. The third fastening portion 521 and the fourth fastening portion 522 are fastened to the other surface of the fuse box bracket 600, a description of which will follow.

In addition, a plurality of second wings 524 configured to be brought into tight contact with the outer surface of the body portion 410 of the fuse 400 is also formed at the inner surface of the rear fuse box 520 in a state of being spaced apart from each other by a predetermined distance. The second wings 524 are similar in function and structure to the first wings 514 described above, and therefore a detailed description thereof will be omitted.

Meanwhile, it is preferable for the front fuse box 510 and the rear fuse box 520, which wrap the fuse 400, to have a detachable structure. For example, one or more pairs of fifth fastening portions 513 may be provided at edges of opposite sides of the front fuse box 510 so as to face the rear fuse box 520, and fifth fastening portions 523, each of which may be flat or recessed, may be formed at the rear fuse box 520 so as to catch the fifth fastening portions 513.

The fuse box 500 may be made of a resin material that exhibits high flame retardancy, heat resistance, insulation, and/or impact resistance capable of preventing electrical conduction while not melting at a relatively high temperature, such as a mixture of polypropylene (PP), polybutylene terephthalate (PBT), and glass fiber (GF) or a mixture of polybutylene terephthalate (PBT) and glass fiber filter (GFF), and may be manufactured using an injection molding method.

FIG. 7 is an exploded perspective view of a battery module connection unit in the battery pack according to the preferred embodiment of the present invention. As shown in FIG. 7, the fuse box 500 is fixed by the fuse box bracket 600 in a state of receiving the fuse 400 in a space defined therein, and the fuse box bracket 600 is securely fixed to the case 100 via a separate fastening means (not shown), for example a well-known fastening means, such as bolts and nuts, in a state of being supported by a flat seating portion 110 of the case 100.

The fuse box bracket 600 includes a pair of side portions 610 having a predetermined height so as to support the side surfaces of the fuse box 500 and a flat portion 620 configured to support the bottom surface of the fuse box 500 while connecting the pair of side portions 610 to each other.

More specifically, each of the pair of side portions 610 includes a fixing portion 611 and a side tight-contact portion 612, and the fixing portion 611 includes a first fixing portion 611(a) and a second fixing portion 611(b) provided with a hole having a predetermined size.

Here, the first fixing portion 611(a) provided at each of the pair of side portions 610 is fastened to a corresponding one of the first (a) fastening portion 511 of the front fuse box 510 and the second (a) fastening portion 521 of the rear fuse box 520, and the second fixing portion 611(b) provided at each of the pair of side portions 610 is fastened to a corresponding one of the second fastening portion 512 of the front fuse box 510 and the fourth fastening portion 522 of the rear fuse box 520.

A projecting portion 621 is formed at a predetermined position on the flat portion 620, which supports the bottom surface of the fuse box 500, so as to project by a predetermined height, which will be described below.

The fuse box bracket 600 may be made of a metal material, such as CR340, 590, 780, or 1180, which is KS carbon steel, so as to securely support and fix the fuse box 500 and to be retained in shape even at high temperature.

FIG. 8 is a sectional view of the fuse and the connection terminals of FIG. 5 cut in an X-axis direction in the battery pack according to the preferred embodiment of the present invention, and FIG. 9 is a sectional view illustrating the position of the fuse at the upper part of the fuse box bracket in the battery pack according to the preferred embodiment of the present invention.

The temperature of the fuse 400 interposed between the connection terminals 300 extending from the unit modules 200 is relatively high even when the battery pack is normally operated, and rises to 1000° C. or higher when an event, such as short circuit, occurs.

In the case in which the fuse box 500, which wraps the fuse 400, melts and flows down, therefore, the fuse 400 is exposed to the outside and comes into tight contact with the fuse box bracket 600 made of a metal material, which supports the fuse box, whereby a greater problem, such as fire outbreak, may be caused.

In order to solve the above problem, as shown in FIG. 8, it is preferable for the fuse 400 according to the present invention, more specifically the body portion 410 of the fuse 400, to include a central portion 411 made of a nonconductor and an edge portion 412 made of a conductor, the central portion being formed so as to have the nonconductor wrap the conductor.

Here, the conductor may be copper or copper/nickel, and the nonconductor may be constituted by ceramics or plastic.

In addition, as shown in FIG. 9, it is preferable for the central portion 411 to be located on the same vertical line as the projecting portion 621 of the fuse box bracket 600, and it is more preferable for the sectional area of the central portion 411 to be equal to or slight greater than the sectional area of the projecting portion 621.

When the battery pack is normally operated, therefore, the function of the fuse is performed due to the edge portion 412, which is made of a conductor. When the fuse box 500 melts and flows down as a result of occurrence of an event, the central portion 411, which is made of a nonconductor, is seated on the projecting portion 621 of the fuse box bracket 600, whereby it is possible to prevent electrical conduction between the fuse 400 and the fuse box bracket 600, which is made of a metal material.

Although the specific details of the present invention have been described in detail, those skilled in the art will appreciate that the detailed description thereof discloses only preferred embodiments of the present invention and thus does not limit the scope of the present invention. Accordingly, those skilled in the art will appreciate that various changes and modifications are possible, without departing from the category and the technical idea of the present invention, and it will be obvious that such changes and modifications fall within the scope of the appended claims.

DESCRIPTION OF REFERENCE SYMBOLS

100: Case
110: Seating portion
200: Battery module
300: Connection terminal
400: Fuse
410: Body portion
411: Central portion 412: Edge portion
420: Connection portion
500: Fuse box
510: Front fuse box
511: First (a) fastening portion 512: First (b) fastening portion
513: First (c) fastening portion 514: First wing
520: Rear fuse box
521: Second (a) fastening portion 522: Second (b) fastening portion
523: Second (c) fastening portion 524: Second wing
600: Fuse box bracket
610: Side portion
611: Fixing portion
611(a): First fixing portion 611(b): Second fixing portion
612: Side tight-contact portion
620: Flat portion
621: Projecting portion

The invention claimed is:

1. A battery pack for electrically connecting two or more unit modules to each other, the battery pack comprising:
a fuse interposed between connection terminals extending from the two or more unit modules;
a fuse box provided at an outer surface of the fuse, the fuse box being made of a nonconductive material; and
a fuse box bracket located under the fuse,
wherein the fuse comprises:
a central portion made of an inner portion formed by a conductor and outer portion formed by a nonconductor and surrounding the inner portion; and
at least one edge portion made of a conductor, the central portion and the at least one edge portion being spaced from each other in an axial direction of the fuse,
wherein the at least one edge portion and the inner portion are electrically connected, and
wherein a width of the inner portion perpendicular to the axial direction of the fuse is less than a width of the at least one edge portion perpendicular to the axial direction of the fuse.

2. The battery pack according to claim 1, wherein the fuse box comprises a front fuse box configured to cover a first portion of the fuse and a rear fuse box configured to cover a second portion of the fuse, the front fuse box and the rear fuse box being detachably attached to each other.

3. The battery pack according to claim 2, wherein the front fuse box is provided at an outer surface thereof with a first fastener and a second fastener, and
wherein the rear fuse box is provided at an outer surface thereof with a third fastener and a fourth fastener.

4. The battery pack according to claim 3, wherein the front fuse box is provided at an inner surface thereof with a plurality of first wings spaced apart from each other by a predetermined distance, the first wings being in contact with the outer surface of the fuse, and wherein the rear fuse box is provided at an inner surface thereof with a plurality of second wings spaced apart from each other by a predetermined distance, the second wings being in contact with the outer surface of the fuse.

5. The battery pack according to claim 3, wherein the pair of side portions of the fuse box bracket is provided with a pair of first fixing portions fastened to the first fastener of the front fuse box and the third fastener of the rear fuse box and a pair of second fixing portions fastened to the second fastener of the front fuse box and the fourth fastener of the rear fuse box.

6. The battery pack according to claim 1, wherein a diameter of the central portion is equal to a diameter of the at least one edge portion.

7. The battery pack according to claim 1, wherein the nonconductor of the central portion surrounds the conductor of the central portion.

8. The battery pack according to claim 1, wherein the nonconductor of the central portion and the conductor of the central portion are coaxial.

9. The battery pack according to claim 1, wherein the at least one edge portion is a pair of edge portions, and
wherein the central portion is between the pair of edge portions in the axial direction of the fuse.

10. The battery pack according to claim 1, wherein the at least one edge portion and the inner portion are cylindrical.

11. The battery pack according to claim 1, wherein the at least one edge portion and the central portion are cylindrical, and
wherein a diameter of the central portion is equal to a diameter of the at least one edge portion where the central portion contacts the at least one edge portion.

12. The battery pack according to claim 1, wherein an outer surface of the inner portion of the central portion contacts an inner surface of the outer portion of the central portion.

13. A battery pack for electrically connecting two or more unit modules to each other, the battery pack comprising:
a fuse interposed between connection terminals extending from the two or more unit modules;
a fuse box provided at an outer surface of the fuse, the fuse box being made of a nonconductive material; and
a fuse box bracket located under the fuse,
wherein the fuse comprises:
a central portion made of a conductor and a nonconductor; and
at least one edge portion made of a conductor, the central portion and the at least one edge portion being spaced from each other in an axial direction of the fuse, and
wherein the fuse box bracket comprises a pair of side portions configured to support side surfaces of the fuse box and a flat portion configured to support a bottom surface of the fuse box while connecting the pair of side portions to each other.

14. The battery pack according to claim 13, wherein a projection is formed on the flat portion so as to project upwards by a predetermined height.

15. The battery pack according to claim 14, wherein the central portion of the fuse is located on a same vertical line to the projection of the fuse box bracket.

16. The battery pack according to claim 15, wherein a sectional area of the central portion of the fuse is equal to or greater than a sectional area of the projection of the fuse box bracket.

17. The battery pack according to claim 13, wherein the fuse box has a melting point of 400° C. or lower.

18. The battery pack according to claim 17, wherein the fuse box bracket is made of a metal material having a melting point higher than a melting point of the fuse box.

19. The battery pack according to claim 18, wherein the fuse is a high voltage (HV) fuse.

* * * * *